US012286031B2

(12) United States Patent
Bhavani Shankar et al.

(10) Patent No.: US 12,286,031 B2
(45) Date of Patent: Apr. 29, 2025

(54) COOLING SYSTEM IN A FUEL CELL ELECTRIC VEHICLE AND METHOD OF CONTROLLING A COOLING SYSTEM IN A FUEL CELL ELECTRIC VEHICLE (71) Applicant: Volvo Truck Corporation, Gothenburg (SE)

(72) Inventors: Vijai Shankar Bhavani Shankar, Gothenburg (SE); Fredrik Blomgren, Hisings Kärra (SE)

(73) Assignee: Volvo Truck Corporation, Gothenburg (SE)

( * ) Notice: Subject to any disclaimer, the term of this patent is extended or adjusted under 35 U.S.C. 154(b) by 444 days.

(21) Appl. No.: 17/903,316

(22) Filed: Sep. 6, 2022

(65) Prior Publication Data
US 2023/0078213 A1 Mar. 16, 2023

(30) Foreign Application Priority Data
Sep. 15, 2021 (EP) ...................... 21196959

(51) Int. Cl.
*B60L 58/33* (2019.01)
*H01M 8/04007* (2016.01)
(Continued)

(52) U.S. Cl.
CPC ......... *B60L 58/33* (2019.02); *H01M 8/04029* (2013.01); *H01M 8/04052* (2013.01);
(Continued)

(58) Field of Classification Search
CPC ......... H01M 8/04029; H01M 8/04052; H01M 8/04074; H01M 8/04604; H01M 8/04626;
(Continued)

(56) References Cited

U.S. PATENT DOCUMENTS
2017/0069920 A1 3/2017 Sakakibara

FOREIGN PATENT DOCUMENTS
CN 112531184 * 3/2021
CN 112531184 A 3/2021
(Continued)

OTHER PUBLICATIONS
English translation of CN Publication 112531184, Mar. 2021.*
(Continued)

*Primary Examiner* — Brittany L Raymond
(74) *Attorney, Agent, or Firm* — Withrow & Terranova, PLLC (57) ABSTRACT A cooling system in a fuel cell electric vehicle comprising a first chamber configured to contain relatively hot fluid and a second chamber configured to contain relatively cold fluid. The ratio of cooling power/fan power of a positive displacement device at a heat exchanger is monitored and thermal energy transfer between coolant and the chambers is controlled based on the ratio. When the ratio is above a pre-defined value or value range, thermal energy from the first chamber is provided to the coolant in the coolant circuit and passed into the heat exchanger, after which part of the thermal energy of cooled coolant leaving the heat exchanger is provided to and stored in the second chamber. The stored cold thermal energy is released from the second chamber when the ratio is below the pre-defined value or value range. The invention also relates to a method of controlling a cooling system.

17 Claims, 8 Drawing Sheets (51) Int. Cl.
*H01M 8/04029* (2016.01)
*H01M 8/0438* (2016.01)
*H01M 8/04537* (2016.01)
*H01M 8/04701* (2016.01)
*H01M 8/04746* (2016.01)

(52) U.S. Cl.
CPC ... *H01M 8/04074* (2013.01); *H01M 8/04425* (2013.01); *H01M 8/04604* (2013.01); *H01M 8/04723* (2013.01); *H01M 8/04768* (2013.01); *B60L 2200/18* (2013.01); *B60L 2200/36* (2013.01); *H01M 2250/20* (2013.01)

(58) Field of Classification Search
CPC ......... H01M 8/04723; H01M 8/04768; H01M 2250/20
See application file for complete search history.

(56) References Cited

FOREIGN PATENT DOCUMENTS

| DE | 10142923 | A1 | | 4/2002 |
| DE | 202006014065 | | * | 11/2006 |
| DE | 202006014065 | U1 | | 11/2006 |
| DE | 102019132088 | A1 | | 5/2021 |

OTHER PUBLICATIONS

English translation of DE Publication 202006014065, Nov. 2006.*
Intention to Grant for European Patent Application No. 20710434.0, mailed Oct. 10, 2023, 26 pages.
European Search Report for European Patent Application No. 21196959.7, mailed Mar. 4, 2022, 8 pages.

* cited by examiner

COOLING SYSTEM IN A FUEL CELL ELECTRIC VEHICLE AND METHOD OF CONTROLLING A COOLING SYSTEM IN A FUEL CELL ELECTRIC VEHICLE

RELATED APPLICATIONS

The present application claims priority to European Patent Application No. 21196959.7, filed on Sep. 15, 2021, and entitled "COOLING SYSTEM IN A FUEL CELL ELECTRIC VEHICLE AND METHOD OF CONTROLLING A COOLING SYSTEM IN A FUEL CELL ELECTRIC VEHICLE," which is incorporated herein by reference in its entirety.

TECHNICAL FIELD

The invention relates to a cooling system in a fuel cell electric vehicle. The invention also relates to a vehicle comprising such a cooling system. The invention further relates to a method of controlling a cooling system in a fuel cell electric vehicle. Additionally, the invention relates to a computer program, a computer readable medium and a control unit for performing the steps of the method.

The invention can be applied in heavy-duty vehicles, such as trucks, buses and construction equipment. Although the invention will be exemplified with respect to a truck, the invention is not restricted to this particular vehicle, but may also be used in other vehicles such as cars.

BACKGROUND

The vehicle industry is striving to reduce $CO_2$ emissions. Various alternatives to diesel and gasoline have been developed for energizing the vehicles. One such alternative is battery electric vehicles. Another alternative is the use of hydrogen gas. The chemical energy of the hydrogen may, for example, be converted into mechanical energy in an internal combustion engine or into electric energy in fuel cells, in order to propel the vehicle.

Fuel cell electric vehicles (FCEVs) such as fuel cell trucks have a very high cooling requirement compared to conventional diesel engine powered trucks. A circulating flowing coolant is used for cooling the fuel cells. The heat deposited from the fuel cells to the coolant is usually dissipated into the ambient through a heat exchanger. A fan may be placed behind the heat exchanger to increase the cooling capacity of the heat exchanger by driving ambient air through the heat exchanger. The cooling power provided is proportional to the fan power and the vehicle speed. The cooling power is also limited by the size of the heat exchanger and the temperature of the ambient air. The energy required to dissipate the heat energy increases and the arrangement is less efficient at higher heat loads due to the properties of the fan. The maximum cooling power is limited by the design power of the fan.

In view of the above, it would be desirable to increase the cooling capacity of existing arrangements as well as to reduce parasitic load due to the fan to improve the energy efficiency of the vehicle.

SUMMARY

An object of the invention is to provide a system and a method, which at least partly mitigate the drawbacks of the prior art. The object is achieved by a system and by a method according to the accompanying independent claims.

The general inventive concept is based on the realization that a cooling buffer may advantageously be provided to cater for situations when the normal cooling capacity of a heat exchanger and fan is not enough. In particular, the inventors have realized that such a cooling buffer may be charged when the ratio of the cooling power vs. fan power is above a predefined value or value range (typically when the cooling capacity is considered to be in excess of what is needed to cool the fuel cells), and when the cooling power vs. fan power is below said predefined value or value range (i.e. not enough cooling capacity to cool the fuel cells) then the cooling buffer may be discharged. An advantage of providing a "hot buffer" is that, when the cooling power vs. fan power is above the predefined value or value range, i.e. when the cooling capacity of the heat exchanger and fan is in excess, thermal energy may advantageously be provided from the hot buffer to make better use of the cooling capacity, and at least some of this additional cooling may be used to charge the cooling buffer.

Thus, according to a first aspect of the present disclosure, there is provided a cooling system in a fuel cell electric vehicle (FCEV), wherein the cooling system comprises:
  a coolant circuit circulating a coolant,
  a heat exchanger for cooling the circulating coolant,
  a positive displacement device for removing thermal energy from the heat exchanger to the environment,
  a first chamber configured to contain relatively hot fluid,
  a second chamber configured to contain relatively cold fluid,
  a control unit configured to monitor the ratio of cooling power/fan power of the positive displacement device and configured to control thermal energy transfer between the coolant and said chambers based on said ratio, wherein
    when the FCEV is operating at a point where said ratio is above a pre-defined value or value range, then thermal energy from the first chamber is provided to the coolant in the coolant circuit and is passed into the heat exchanger, after which part of the thermal energy of the cooled coolant leaving the heat exchanger is provided to and stored in the second chamber, and
    when the FCEV is operating at a point where said ratio is below said pre-defined value or value range, then stored cold thermal energy from the second chamber is provided to the coolant in the coolant circuit to reduce the temperature of the coolant before it is passed to the fuel cells of the FCEV, after which part of the thermal energy of the heated coolant leaving the fuel cells is provided to and stored in the first chamber.

By the provision of a cooling system which comprises a first ("hot") chamber and a second ("cold") chamber that can thermally affect the coolant in the coolant circuit in a controlled manner, an improved cooling capacity and energy efficiency is achieved.

The positive displacement device may for instance be, or comprise, a fan. However, it may be any other device that moves an external fluid (typically air) to assist the heat exchanger in dissipating heat to the environment. For example, the positive displacement device may be, or comprise, a compressor. It should be understood that when using the term "fan power" in this disclosure, it does not necessarily mean that the positive displacement device is a fan. Rather this term is used consistently for simplicity, regardless of the specific type of positive displacement device.

Similarly, the abbreviation COPfan will be introduced below, and it should be understood that this likewise is not limited to the positive displacement device being a fan.

The fan power of the positive displacement device is a measure of the energy supplied to the positive displacement device. The cooling power is a measure of how much heat can be rejected to the environment under current operating conditions of the vehicle. The cooling power may thus be affected by the outside air temperature, the vehicle speed (air speed) and the speed of the positive displacement device. For example, the cooling power may be expressed as:

$$\text{Cooling power} = \text{massflow} * Cp * dT$$

where
  massflow=f(air speed, air temperature, speed of positive displacement device),
  Cp=f(coolant mass, coolant type, temperature)
  dT=coolant temperature−ambient temperature The control unite may thus determine the present ratio of cooling power/fan power of the positive displacement device, e.g., based on sensor inputs, such as including speed sensor, temperature sensors, etc.

The ratio of cooling power provided for a given fan power is thus the Coefficient of Performance of the fan (COPfan). The inventive concept provides a strategy to harvest cooling power available at operating points where COPfan is very high and deploy that in operating points where cooling power is insufficient or COPfan is very low. Thus, the inventive concept increases cooling capacity and enables a reduction in power required to operate the cooling system.

The ratio, COPfan, may thus be compared to a predefined value or to a predefined value range. A predefined value range may be advantageous as it allows for tolerances and errors of margin which might occur from for example sensor inputs. Furthermore, it may be desirable to have a first value to be exceeded for charging the cooling system (i.e., the ratio COPfan is above such a first value) and to be below a different second value for discharging the cooling system (i.e. the ratio COPfan is below such second value). The first and second values may together define a value range.

As explained above, the first chamber is configured to contain relatively hot fluid, i.e. it functions as a hot buffer, while the second chamber is configured to contain relatively cold fluid, i.e. it functions as a cooling buffer. The temperature of the relatively hot fluid will normally be above the average temperature of the coolant in the coolant circuit. In other words, the thermal potential energy of the fluid in first chamber is normally positive relative to the thermal energy of the coolant in the coolant circuit. Conversely, the temperature of the relatively cold fluid will normally be below the average temperature of the coolant in the coolant circuit. In other words, the thermal potential energy of the fluid in second chamber is normally negative relative to the thermal energy of the coolant in the coolant circuit.

The control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where it includes a programmable device such as the microprocessor, microcontroller or programmable digital signal processor mentioned above, the processor may further include computer executable code that controls operation of the programmable device.

The transferring of thermal energy between the coolant in the coolant circuit and the chambers may accomplished in various manners. For instance, the thermal energy may be transferred via fluid connections or via thermal connections. Thus, it should be understood that the thermal energy may in some embodiments be transferred by passing a fluid to/from the coolant circuit, and in some embodiments by providing an interface the temperature of which may be controlled and by which the coolant can pass to pick up or release heat.

Thus, according to at least one exemplary embodiment, the cooling system comprises fluid connections for providing said first and second chambers in fluid communication with said coolant circuit, wherein thermal energy is provided to said chambers by passing coolant into said chambers, and wherein thermal energy is released from said chambers by passing coolant away from the chambers.

Fluid connections provide a simple and practical way of transferring thermal energy. Suitably, the fluid that flows through the fluid connections is some of the coolant in the coolant circuit. When the coolant has passed through the fuel cell arrangement, its temperature has been raised. Some of that coolant having raised temperature may suitably be diverted to the first chamber and stored. Later, when COPfan is high, the hot coolant may be returned to the coolant circuit. Similarly, when the coolant has passed through the heat exchanger and lowered its temperature, the cooled coolant may be diverted into the second chamber and stored. Later, when COPfan is low, the cooled coolant may be returned to the coolant circuit.

In some exemplary embodiments, at least one of the first and second chamber may be in fluid communication with the coolant circuit by means of a single fluid connection in which fluid may be passed both ways, e.g., using a bi-directional pump. In other exemplary embodiments, at least one of the first and second chamber may be in fluid communication with the coolant circuit by means of two fluid connections, one for leading fluid into the chamber (e.g., via a valve that can be selectively opened and closed) and one for returning fluid to the coolant circuit (e.g., via a pump).

As understood from above, according to at least one exemplary embodiment, the cooling system comprises valves for regulating flow of coolant to and from said chambers, wherein the control unit is configured to control said valves based on the value of said ratio. Valves provide a simple and effective way to control the fluid flow and thus thermal energy transfer. For example, when the ratio, COPfan, is above the predefined value or value range, then a valve at the first chamber may be closed preventing coolant to pass into the first chamber while a valve at the second chamber may be opened allowing coolant to pass into the second chamber. Hereby, cold thermal energy is stored in the first chamber for future cooling of the coolant. When the ratio, COPfan, is below the predefined value or value range, i.e., the cooling efficiency is not enough, then a valve at the second chamber may be closed preventing the relatively cool fluid from entering the second chamber (all the cooled fluid is needed to the be supplied to the fuel cells) and the stored cold thermal energy may be released from the second chamber as a supplement to aid in cooling the fuel cells. In the meantime, a valve at the first chamber is suitably open to allow the coolant heated by the fuel cells to the be stored in the first chamber as a hot buffer for future use when the cooling efficiency is once again in excess.

As already understood from above, according to at least one exemplary embodiment, the cooling system comprises a first pump for pumping coolant from the first chamber to the coolant circuit and a second pump for pumping coolant from the second chamber to the coolant circuit, wherein the control unit is configured to activate the first pump when said ratio is above said pre-defined value or value range, wherein the control unit is configured to activate the second pump when said ratio is below said pre-defined value or value range. This is advantageous as a pump is a well-controllable component for transferring fluid from the chambers to the coolant circuit.

According to at least one exemplary embodiment, the first and second chambers are variable volume chambers located in a common vessel, the chambers being separated by a movable separation member, such as a diaphragm or a plunger, wherein the pressure difference across the movable separation member is used for driving the coolant out from the respective chamber when the control unit controls said valves based on said ratio. This is advantageous as the pumps in the previously discussed exemplary embodiments may be omitted. The control unit only needs to control the opening and closing of the valves, and the pressure difference across the movable separation member will after opening of a valve cause the movable separation member to move and thus push the fluid out of the relevant chamber. Thus, the force of the movable separation member, which has been built up by the creating the pressure difference, may replace the force exerted by the pumps in the previous examples.

According to at least one exemplary embodiment, the cooling system comprises a heat exchanging device in thermal connection to the first chamber and the second chamber, wherein thermal energy is transferred between the coolant circuit and the first and second chambers via said heat exchanging device. Since there is no exchange of fluids between the coolant circuit and the chambers, the first and second chambers may advantageously contain a different fluid than the coolant in the coolant circuit. For example, a less expensive fluid may be used in the chambers.

According to at least one exemplary embodiment, the control unit is configured to monitor the state of charge of an electrical storage system (ESS) of the FCEV, and upon determination of a certain surplus of energy in the ESS the control unit controls at least a part of said surplus of energy to be supplied to the positive displacement device to increase the thermal energy removed from the heat exchanger, wherein thermal energy from the first chamber is provided to the coolant of the coolant circuit and is passed into the heat exchanger, after which part of the thermal energy of the cooled coolant leaving the heat exchanger is provided to and stored in the second chamber. This is advantageous as excess electrical energy may be used to boost the performance of the positive displacement device. Put differently, at least some of the excess electrical energy may converted and stored as coo thermal energy in the second chamber. The excess electrical energy may for example be produced during braking events and may for example be available at vehicle idle operation.

According to at least one exemplary embodiment, the control unit is configured to increase the fan power of the positive displacement device when the FCEV is operating at a point when said ratio is above said pre-defined value or value range. This is particularly advantageous in combination with surplus of energy in the ESS being supplied to the positive displacement device.

According to a second aspect of the present disclosure, there is provided a vehicle comprising a cooling system according to the first aspect, including any embodiment thereof. The advantages of the vehicle of the second aspect are largely analogous to the advantages of the cooling system of the first aspect, including any embodiment thereof.

According to a third aspect of the present disclosure, there is provided a method of controlling a cooling system in a fuel cell electric vehicle (FCEV), wherein the cooling system comprises a coolant circuit circulating a coolant, a heat exchanger for cooling the circulating coolant and a positive displacement device for removing thermal energy from the heat exchanger to the environment, the method comprising:
  providing a first chamber configured to contain relatively hot fluid and a second chamber configured to contain relatively cold fluid,
  monitoring the ratio of cooling power/fan power of the positive displacement device, and
  when the FCEV is operating at a point where said ratio is above a pre-defined value or value range, then thermal energy from the first chamber is provided to the coolant in the coolant circuit and is passed into the heat exchanger, after which part of the thermal energy of the cooled coolant leaving the heat exchanger is provided to and stored in the second chamber, and
  when the FCEV is operating at a point where said ratio is below said pre-defined value or value range, then stored cold thermal energy from the second chamber is provided to the coolant in the coolant circuit to reduce the temperature of the coolant before it is passed to the fuel cells of the FCEV, after which part of the thermal energy of the heated coolant leaving the fuel cells is provided to and stored in the first chamber.

The advantages of the method of the third aspect are largely analogous to the advantages of the control system of the first aspect and the vehicle of the second aspect, including any embodiments thereof.

Some exemplary embodiments of the method of the third aspect are listed below.

According to at least one exemplary embodiment, said providing of thermal energy to/from either one of the first and second chambers comprises transferring coolant between the coolant circuit and the first and second chambers, respectively.

According to at least one exemplary embodiment, the cooling system further comprises a heat exchanging device in thermal connection with the first and second chambers, wherein said providing of thermal energy to/from either one of the first and second chambers comprises transferring thermal energy between the coolant of the coolant circuit and the first and second chambers, respectively via said heat exchanging device.

According to at least one exemplary embodiment, the method comprises:
  monitoring the state of charge of an electrical storage system (ESS) of the FCEV,
  upon determination of a certain surplus of energy in the ESS, supplying at least a part of said surplus of energy to the positive displacement device to increase the thermal energy removed from the heat exchanger, and
  providing thermal energy from the first chamber to the coolant of the coolant circuit which is passed into the heat exchanger, after which part of the thermal energy of the cooled coolant leaving the heat exchanger is provided to and stored in the second chamber.

According to at least one exemplary embodiment, the method comprises increasing the fan power of the positive displacement device when the FCEV is operating at a point when said ratio is above said pre-defined value or value range.

According to a fourth aspect of the present disclosure, there is provided a computer program comprising program code means for performing the steps of the method of the third aspect, including any embodiment thereof, when said program is run on a computer. The advantages of the computer program of the fourth aspect are largely analogous to the advantages of the method of the third aspect, including any embodiment thereof.

According to a fifth aspect of the present disclosure, there is provided a computer readable medium carrying a computer program comprising program code means for performing the steps of the method of the third aspect, including any embodiment thereof, when said program product is run on a computer. The advantages of the computer readable medium are largely analogous to the advantages of the method of the third aspect, including any embodiment thereof.

According to a sixth aspect of the present disclosure, there is provided a control unit for controlling a cooling system of a fuel cell electric vehicle (FCEV), the control unit being configured to perform the steps of the method according to the third aspect, including any embodiment thereof. The advantages of the control unit of the sixth aspect are largely analogous to the advantages of the method of the third aspect.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

The invention will now be described more fully hereinafter with reference to the accompanying drawings, in which certain aspects of the invention are shown. The invention may, however, be embodied in many different forms and should not be construed as limited to the embodiments and aspects set forth herein; rather, the embodiments are provided by way of example so that this disclosure will be thorough and complete, and will fully convey the scope of the invention to those skilled in the art. Accordingly, it is to be understood that the present invention is not limited to the embodiments described herein and illustrated in the drawings; rather, the skilled person will recognize that many changes and modifications may be made within the scope of the appended claims. Like reference numerals refer to like elements throughout the description.

Figure 1:
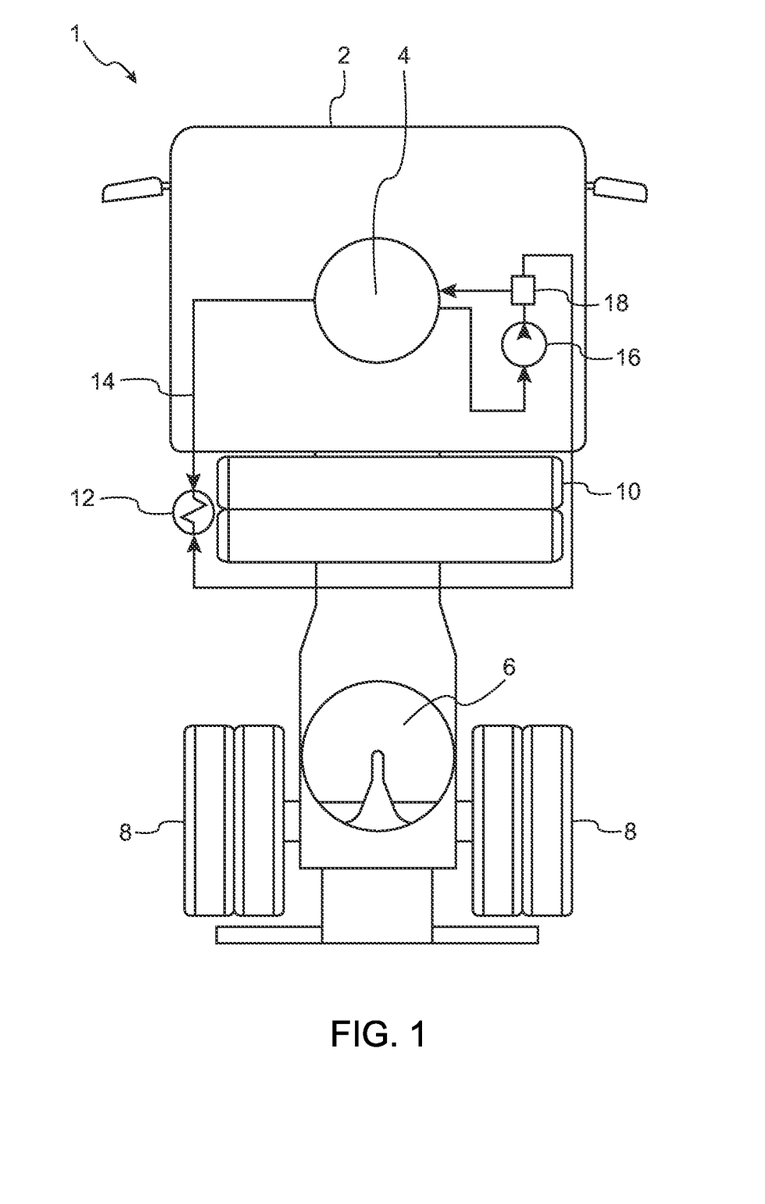
FIG. 1 illustrates a vehicle that may incorporate a cooling system according to at least one exemplary embodiment of the invention.

FIG. 1 illustrates schematically a vehicle 1 (in particular, a fuel cell electric vehicle, FCEV) on which at least some exemplary embodiments of the invention may be implemented. Although the vehicle 1 is illustrated in the form of a truck, other types of vehicles, such as busses, construction equipment, trailers, passenger cars or even boats may be provided in accordance with the invention. The truck (vehicle 1) comprises a cab 2 in which a driver may operate the vehicle 1. The vehicle 1 comprises an energy conversion system 4 which includes a stack of fuel cells. The illustration is made relative to a schematic outline of certain parts of a truck, however, it should be understood that the specific location of the components may be placed differently than in the exemplary illustration. In the illustration the cab 2 of the truck, a connector 6 for towing a trailer and a pair of rear wheels 8 of the truck have been schematically indicated. The fuel cells 4 may be provided at the cab 2, for example under the cab 2. Behind the cab 2, there are provided hydrogen tanks 10 for storing hydrogen gas which may be supplied to the fuel cells 4. The hydrogen tanks 10 are merely illustrated schematically and only two are shown. However, it should be understood that the vehicle 1 may have more hydrogen tanks, or fewer. Although not illustrated, the hydrogen tanks 10 may suitably be held by a rack attached to the chassis, or by any other suitable support structure.

The vehicle 1 further comprises a heat exchanger 12 and a cooling passage 14 for circulating a coolant, i.e., a cooling fluid, such as a liquid, for example glycol-based. The cooling passage 14 extends from the heat exchanger 12 and passes along the stack of fuel cells 4 for transporting heat away from the stack of fuel cells 4.

A pump 16 is provided to pump coolant that has taken up heat from the stack of fuel cells 4. Downstream of the pump 16 there may be provided a thermostat 18 which senses the temperature of the coolant in the conduit and if the temperature is above a predefined value the coolant may be led back to the heat exchanger 12 to be cooled down before returning to the stack of fuel cells 4. If the thermostat 18 determines that the temperature of the coolant is still low enough, it may be returned to the stack of fuel cells 4 without being led through the heat exchanger 12.

The vehicle 1 illustrated in FIG. 1 may suitably be modified by implementing a cooling system in accordance with the following exemplary embodiments that will now be discussed.

Figure 2:
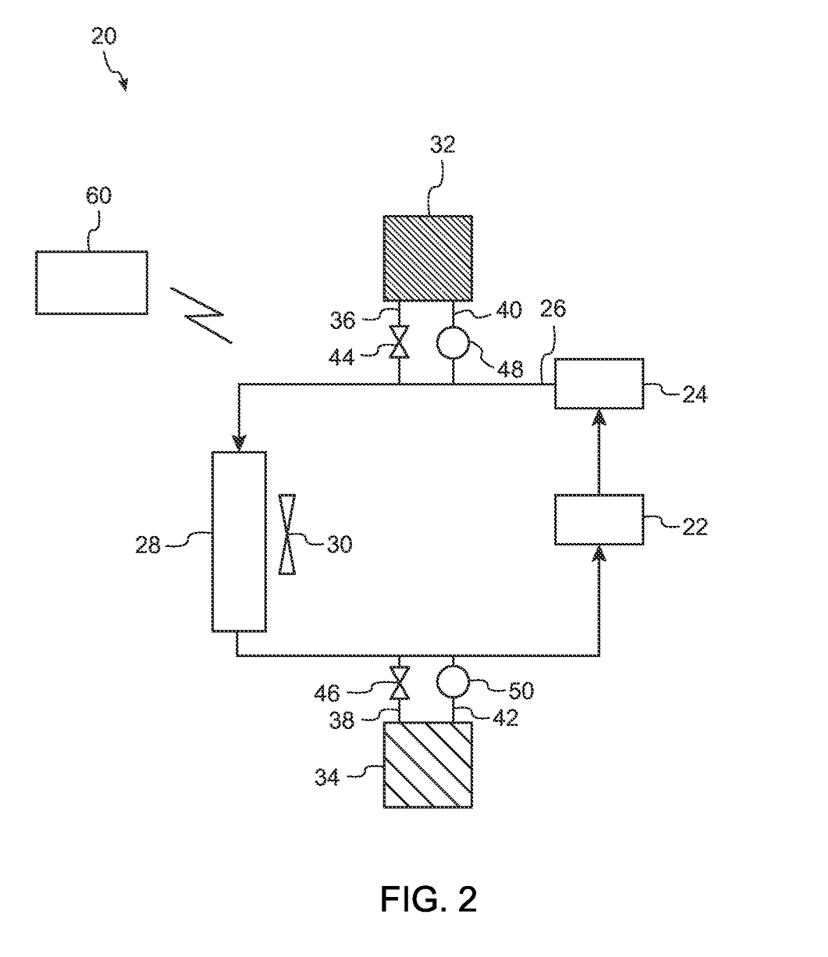
FIG. 2 illustrates a cooling system according to at least one exemplary embodiment of the invention.

FIG. 2 illustrates very schematically a cooling system 20 according to at least one exemplary embodiment of the invention. Similarly to FIG. 1 there are provided fuel cells 22, in some type of fuel cell arrangement, for example in the form of a stack of fuel cells. The fuel cells 22 need to be cooled and a coolant pump 24 is provided to pump the coolant around a coolant passage or coolant circuit 26. The coolant pump 24 pumps the coolant from the fuel cells 22 to and through a heat exchanger 28 and back to the fuel cells 22. Although not illustrated in FIG. 2, there may similarly to the illustration of FIG. 1 optionally be provided a thermostat to determine if the temperature of the coolant is still low enough for it to be returned to the fuel cells 22 without being led through the heat exchanger 28.

As illustrated in FIG. 2, there is provided a positive displacement device 30, here illustrated in the form of a fan, for blowing air onto the heat exchanger 28 to improve dissipation of heat from the heat exchanger 28. The dissipation of heat is not only dependent on the flow of air from the positive displacement device 30, but may also be dependent on other factors such as the exterior relative air flow caused by the vehicle speed, the air temperature, the type of coolant, the mass of coolant, etc.

The cooling system 20 also comprises a first chamber 32, such as in a tank, and a second chamber 34, such as in another tank. Each one of the first chamber 32 and second chamber 34 is operatively connected to the coolant circuit 26. More specifically, there are provided fluid connections 36, 38, 40, 42 for enabling communication of fluid between the coolant circuit 26 on the one hand and the first and second chambers 32, 34 on the other hand. Although the communication for each one of the first and second chambers 32, 34 may be established by a single bi-directional conduit, in the present illustration the communication is established by means of an inlet conduit 36, 38 and an outlet conduit 40, 42. Each inlet conduit 36, 38 allows fluid in the form of coolant to be diverted from the coolant circuit 26 and into the respective first and second chamber 32, 34. A valve 44, 46 is provided in each inlet conduit 36, 38 to enable or disable transfer of coolant from the coolant circuit 26 to the first and second chambers 32, 34. Each outlet conduit 40, 42 allows fluid to be passed from the first and second chambers 32, 34, respectively, to the coolant circuit 26. Thus, coolant that has once been diverted and stored in the first and second chambers 32, 34 may at a later point in time be returned to the coolant circuit 26. A pump 48, 50 is provided in each outlet conduit 40, 42 to enable transfer of coolant from the respective chamber 32, 34 to the coolant circuit 26. In some exemplary embodiments, it may be conceivable to have a bi-directional conduit for one of the first and second chambers 32, 34, while the other one is associated with separate inlet and outlet conduits.

The cooling system 20 further comprises a control unit 60. The control unit 60 may communicate with other components wirelessly or by wire. The control unit 60 is configured to monitor the ratio of cooling power/fan power (COPfan) of the positive displacement device 30. The control unit 60 is also configured to control thermal energy transfer between the coolant and said chambers 32, 34 based on said ratio. As can be understood from FIG. 2, since the first chamber 32 is located downstream of the fuel cells 22 (which raise the temperature of the coolant) but upstream of the heat exchanger 28 (which lowers the temperature of the coolant), the first chamber 32 is configured to contain relatively hot fluid. Conversely, since the second chamber 34 is located downstream of the heat exchanger 28 but upstream of the fuel cells 22, the second chamber 34 is configured to contain relatively cold fluid.

As will be discussed in more detail below, when the vehicle is operating at a point where said ratio (COPfan) is above a pre-defined value or value range, then the control unit 60 is configured to cause thermal energy from the first chamber 32 to be provided to the coolant in the coolant circuit 26 and passed into the heat exchanger 28, after which part of the thermal energy of the cooled coolant leaving the heat exchanger 28 is provided to and stored in the second chamber 34. Conversely, when the vehicle is operating at a point where said ratio (COPfan) is below said predefined value or value range, then the control unit 60 is configured to provide stored cold thermal energy from the second chamber 34 to the coolant in the coolant circuit to reduce the temperature of the coolant before it is passed to the fuel cells 22, after which part of the thermal energy of the heated coolant leaving the fuel cells 22 is provided to and stored in the first chamber 32.

It should be understood that although a schematic control unit 60 is only illustrated in FIG. 2, such a control unit is, in practice, also included in the other exemplary embodiments (that will be discussed below) for controlling the operation of the cooling system and performing the method of controlling the cooling system of those exemplary embodiments.

Figure 2A:
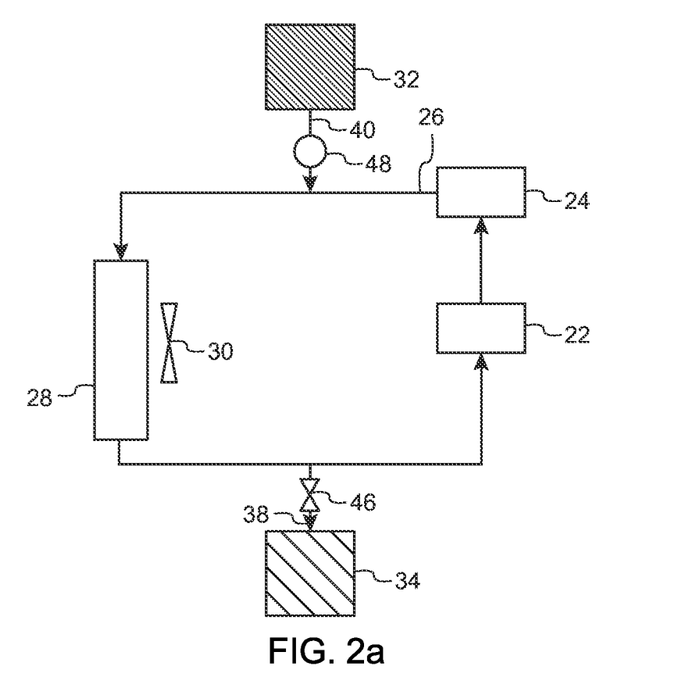
FIGS. 2a and 2b illustrate, in accordance with at least one exemplary embodiment, a method of operating the cooling system of FIG. 2.
Figure 2B:
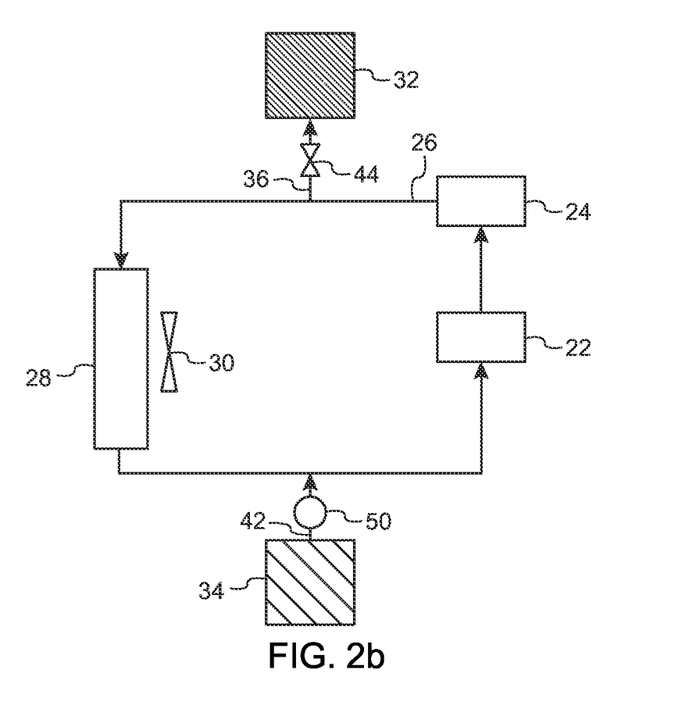

FIGS. 2a and 2b illustrate, in accordance with at least one exemplary embodiment, a method of operating the cooling system 20 of FIG. 2. FIG. 2a illustrates the operation of the cooling system 20 during a charge mode of the cooling system 20. FIG. 2b illustrates the operation of the cooling system 20 during a discharge mode of the cooling system 20. For explanatory purposes only the active conduits are shown in FIGS. 2a and 2b. Thus, when a valve is closed, the corresponding conduit is not illustrated.

FIG. 2a illustrates that if the vehicle is operating at a point where the ratio (COPfan) is above a predefined value or value range, the fluid from the first chamber 32 is pumped into the coolant circuit 26 and is passed into the heat exchanger 28. In other words thermal energy from the first chamber 32 is provided to the coolant in the coolant circuit 26 and is passed into the heat exchanger 28. The fan power of the positive displacement device 30 may be increased to achieve the required coolant outlet temperature from the heat exchanger 28. The valve 46 at the inlet conduit 38 of the second chamber 34 is open and part of the cooled fluid enters the second chamber 34. In other words, part of the thermal energy of the cooled coolant leaving the heat exchanger 28 is provided to and stored in the second chamber 34.

FIG. 2b illustrates that if the vehicle is operating at a point where the ratio (COPfan) is below the predefined value or value range, the fluid from the second chamber 34 is pumped (by means of the pump 50 in outlet conduit 42, controlled by the control unit) into the coolant circuit 26 and flows through the fuel cells 22. In other words, the stored cold thermal energy from the second chamber 34 is provided to the coolant in the coolant circuit 26 to reduce the temperature of the coolant before it is passed to the fuel cells 22 of the vehicle. Part of the fluid heated by the fuel cells 22 is then diverted into the first chamber 32 via the open valve 44 in the inlet conduit 36 to the first chamber 32. Thus, part of the thermal energy of the heated coolant leaving the fuel cells 22 is provided to and stored in the first chamber 32.

From the above it can be understood that during charge mode (FIG. 2a), the high performance of the heat exchanger 28 and positive displacement device 30 is used for storing energy in the form of cold coolant in the second chamber 34. Next, during the discharge mode (FIG. 2b), the stored cold thermal energy is used for reducing the energy demand of the positive displacement device 30 to maintain the temperature requirements.

Figure 3:
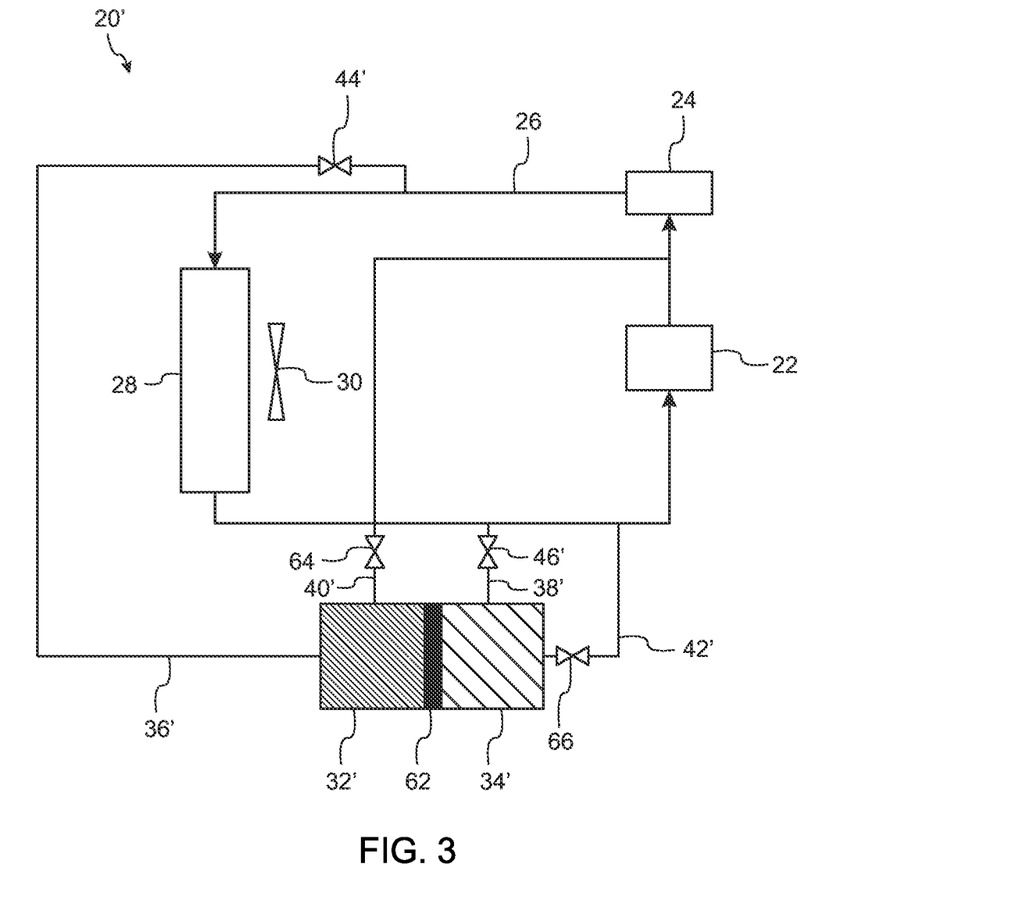
FIG. 3 illustrates a cooling system according to at least another exemplary embodiment of the invention.

FIG. 3 illustrates a cooling system 20' according to at least another exemplary embodiment of the invention. Similarly to FIG. 2, each one of the first chamber 32' and the second chamber 34' can be arranged in fluid communication with the coolant circuit 26. However, instead of using dedicated pumps at outlet conduits for moving the coolant from the chambers 32', 34', the moving force is achieved by means of a diaphragm 62 subjected to a differential pressure. The first and the second chambers 32', 34' may be provided in a common vessel, but are separated by the intermediate diaphragm 62 extending across the vessel. In other words, the first and second chambers 32', 34' are variable volume chambers, wherein the volume is varied based on the movement of the diaphragm 62. It should be understood that any other appropriate movable separation member may be used instead of a diaphragm, such as for instance a plunger. Similarly to FIG. 2, in FIG. 3 each chamber 32', 34' is associated with an inlet conduit 36', 38' and an outlet conduit 40', 42'. The inlet conduits 36', 38' as well as the outlet conduits 40', 42' are provided with valves 44', 46', 64, 66. When the valve 44', 46' of an inlet conduit 36', 38' is open, coolant from the coolant circuit 26 is allowed to pass into the chamber which is interconnected with the coolant circuit by means of the inlet conduit. When the valve 64, 66 of one of the outlet conduits 40', 42' is open, coolant is allowed to pass out from the associated chamber to the coolant circuit 26.

Figure 3A:
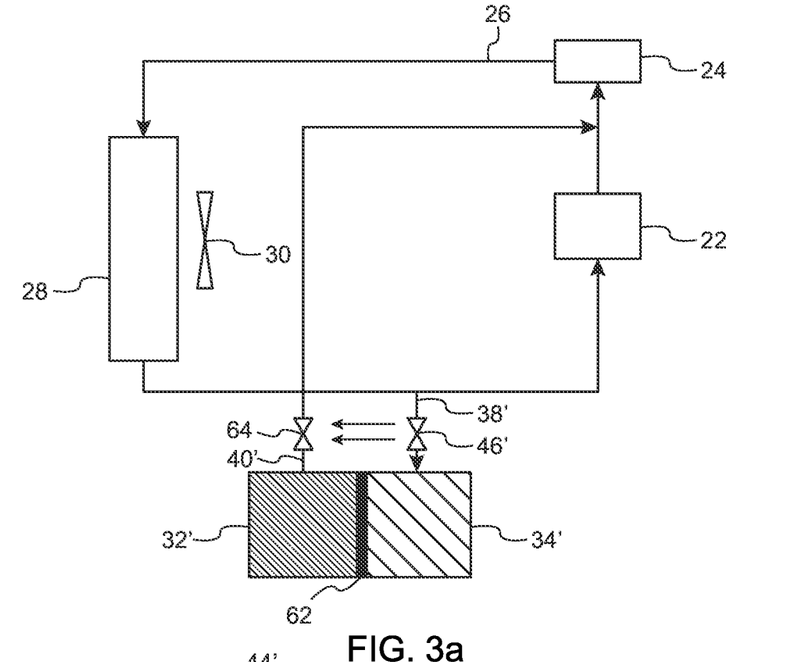
FIGS. 3a and 3b illustrate, in accordance with at least one exemplary embodiment, a method of operating the cooling system of FIG. 3.
Figure 3B:
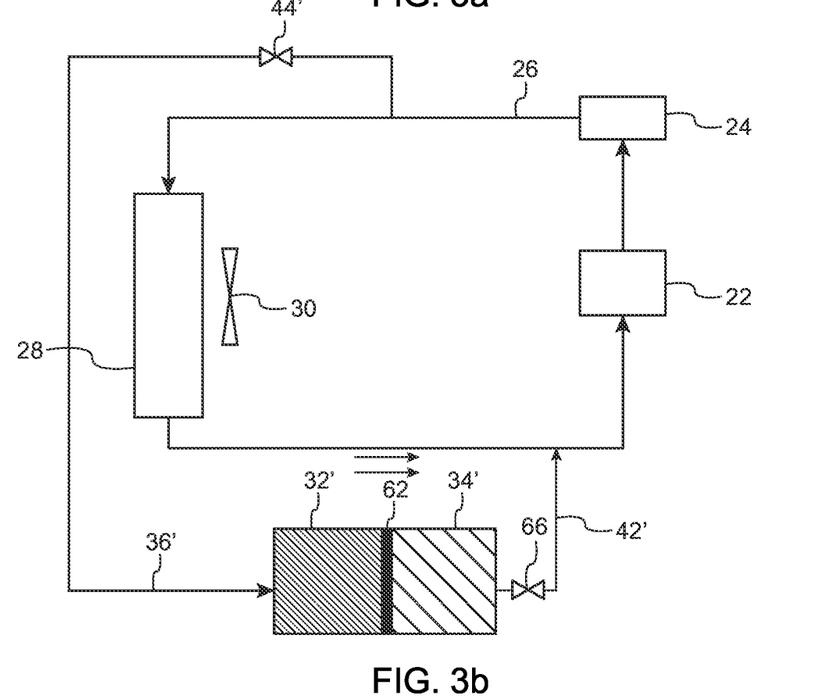

FIGS. 3*a* and 3*b* illustrate, in accordance with at least one exemplary embodiment, a method of operating the cooling system 20' of FIG. 3. FIG. 3*a* illustrates the operation of the cooling system 20' during a charge mode of the cooling system 20'. FIG. 3*b* illustrates the operation of the cooling system 20' during a discharge mode of the cooling system 20'. For explanatory purposes only the active conduits are shown in FIGS. 3*a* and 3*b*. Thus, when a valve is closed, the corresponding conduit is not illustrated.

FIG. 3*a* illustrates that if the vehicle is at a point where the ratio (COPfan) is above a predefined value or value range, the fluid from the first chamber 32' is pressed into the coolant circuit 26 and is passed into the heat exchanger 28. The valve 46' at the inlet conduit 38' to the second chamber 34' has been opened and the valve 64 at the outlet conduit 40' from the first chamber 32' is open. Since the coolant pump 24 displaces the coolant in the coolant circuit 26, the coolant enters the second chamber 34' creating a higher pressure than in the first chamber 32' (pressure difference indicated by the pair of arrows pointing left in the figure). This causes the diaphragm 62 to push coolant out from the first chamber 32'. Thus, similarly to the example in FIG. 2*a*, here in FIG. 3*a*, thermal energy from the first chamber 32' is provided to the coolant in the coolant circuit 26 and is passed into the heat exchanger 28, and part of the thermal energy of the cooled coolant leaving the heat exchanger 28 is provided to and stored in the second chamber 34'.

FIG. 3*b* illustrates that if the vehicle is operating at a point where the ratio (COPfan) is below the predefined value or value range, the opening and closing of the valves are switched. Now, in contrast to FIG. 3*a*, the valve 44' at the inlet conduit 36' to the first chamber 32' is opened and the valve 66 at the outlet conduit 42' from the second chamber 34' is opened. The pressure difference is reversed (indicated by the pair of arrows point to the right in the figure) and the diaphragm 62 will cause fluid from the second chamber 34' to be pushed into the coolant circuit 26 and to flow through the fuel cells 22. In other words, the stored cold thermal energy from the second chamber 34' is provided to the coolant in the coolant circuit 26 to reduce the temperature of the coolant before it is passed to the fuel cells 22 of the vehicle, and part of the thermal energy of the heated coolant leaving the fuel cells 22 is diverted to and stored in the first chamber 32'.

Figure 4:
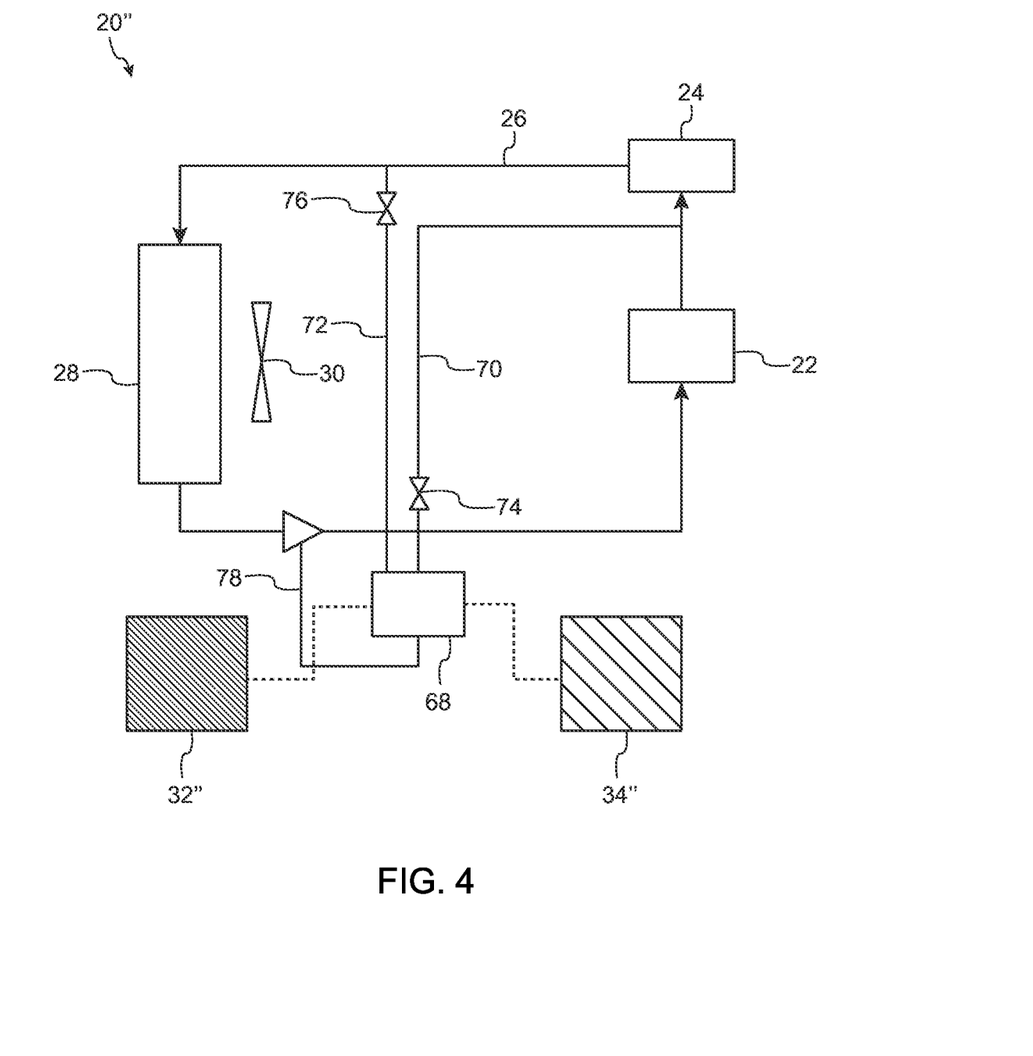
FIG. 4 illustrates a cooling system according to at least yet another exemplary embodiment of the invention.

FIG. 4 illustrates a cooling system 20" according to at least yet another exemplary embodiment of the invention. Unlike the exemplary embodiments shown in FIGS. 2 and 3, the embodiment in FIG. 4 does not allow fluid communication between the coolant circuit 26 and the first and second chambers 32", 34". Instead, thermal energy is transferred through a thermal connection. FIG. 4 illustrates that the cooling system 20" comprises a heat exchanging device 68 which is in thermal connection with the first chamber 32" and the second chamber 34" (illustrated by the dotted lines). Thermal energy is transferred between the coolant circuit 26 and the first and second chambers 32", 34" via said heat exchanging device 68. Thus, fluid may pass through the heat exchanging device 68 between the first and second chambers 32", 34". The fluid may be a different fluid than the coolant fluid. FIG. 4 also shows that the cooling system 20" has a first passage 70 and a second passage 72, each one having a valve 74, 76. The heat exchanging device 68 is located in a bypass portion 78 to the coolant circuit 26.

Figure 4A:
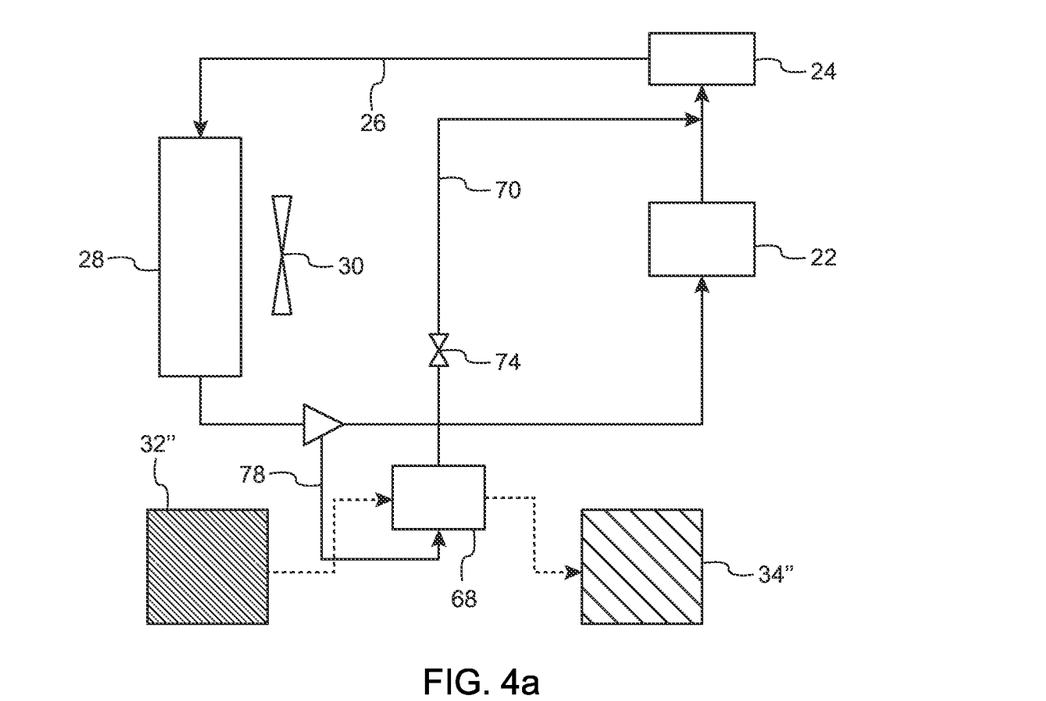
FIGS. 4a and 4b illustrate, in accordance with at least one exemplary embodiment, a method of operating the cooling system of FIG. 4.
Figure 4B:
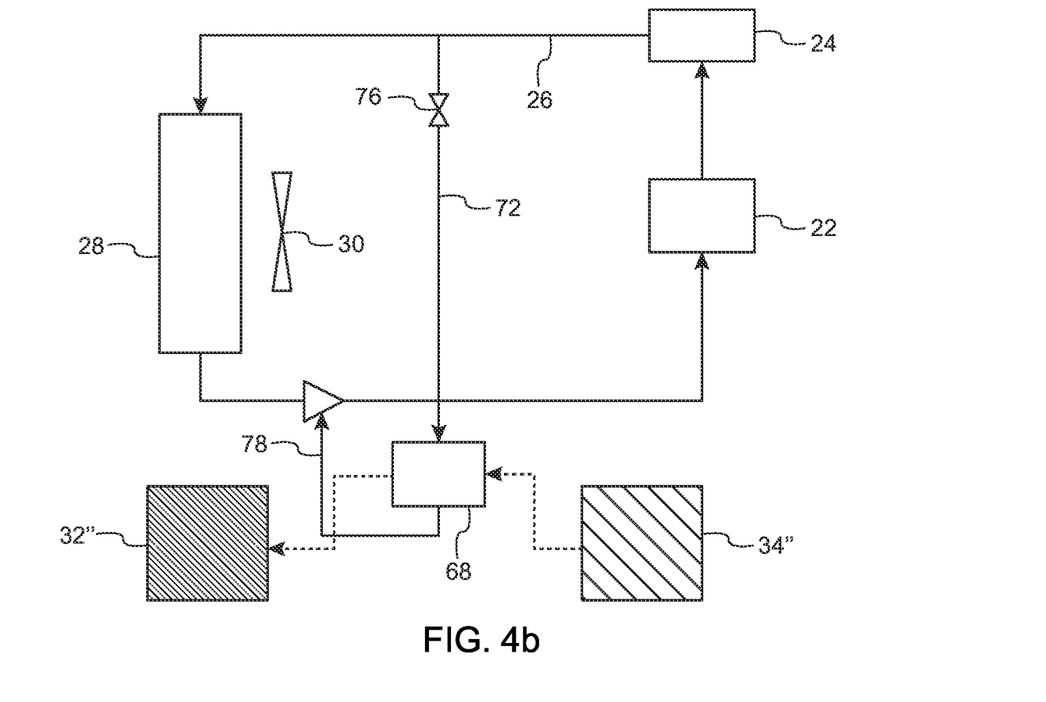

FIGS. 4*a* and 4*b* illustrate, in accordance with at least one exemplary embodiment, a method of operating the cooling system 20" of FIG. 4. FIG. 4*a* illustrates the operation of the cooling system 20" during a charge mode of the cooling system 20". FIG. 4*b* illustrates the operation of the cooling system 20" during a discharge mode of the cooling system 20". For explanatory purposes only the active conduits are shown in FIGS. 4*a* and 4*b*. Thus, when a valve is closed, the corresponding conduit is not illustrated.

FIG. 4*a* illustrates that if the vehicle is at a point where the ratio (COPfan) is above a predefined value or value range, part of the coolant that has exited the heat exchanger 28 is diverted into the bypass portion 78 to be led through the heat exchanging device 68. At the same time, the separate fluid from the first chamber 32" is moved through the heat exchanging device 68 (e.g. by means of a pump). As the fluid moves through the heat exchanging device 68 it will transfer thermal energy to the coolant. Thus, the coolant will be heated, while the fluid will be cooled. The cooled fluid enters and is stored in the second chamber 34". Thus, in the illustrated charge mode, part of the cooled coolant that exits the heat exchanger 28 is guided to the fuel cells 22, but another part is guided through the heat exchanging device 68 in the bypass portion 78. The heated coolant leaves the heat exchanging device 68 and is guided via the first passage and its opened valve 74 to a location downstream of the fuel cells 22 but upstream of the heat exchanger 28. Thus, similarly to the examples in FIGS. 2*a* and 3*a*, here in FIG. 4*a*, thermal energy from the first chamber 32" is provided to the coolant, however, here via the heat exchanging device 68, and is passed into the heat exchanger 28, and part of the thermal energy of the cooled coolant leaving the heat exchanger 28 is provided to and stored in the second chamber 34" as stored cold thermal energy.

FIG. 4*b* illustrates that if the vehicle is operating at a point where the ratio (COPfan) is below the predefined value or value range, the fluid from the second chamber 34" is moved through the heat exchanging device 68 (e.g. by means of a pump). Simultaneously, some of the coolant is diverted to pass through the heat exchanging device 68 via the now operand valve 76 of the second passage 72, and thermal energy will be transferred from the coolant to the other fluid in the heat exchanging device 68. Thus, the chamber fluid will take up heat and then be passed to the first chamber 34", while the coolant will lose heat and be cooled and then passed via the bypass portion 78 (in reverse direction) back to the coolant circuit 26 and the fuel cells 22. Thus, as in the previous example, the stored cold thermal energy from the second chamber 34" is provided to the coolant in the coolant circuit to reduce the temperature of the coolant before it is passed to the fuel cells 22 of the vehicle, and part of the thermal energy of the heated coolant leaving the fuel cells 22 is passed to and stored in the first chamber 32'''.

Figure 5:
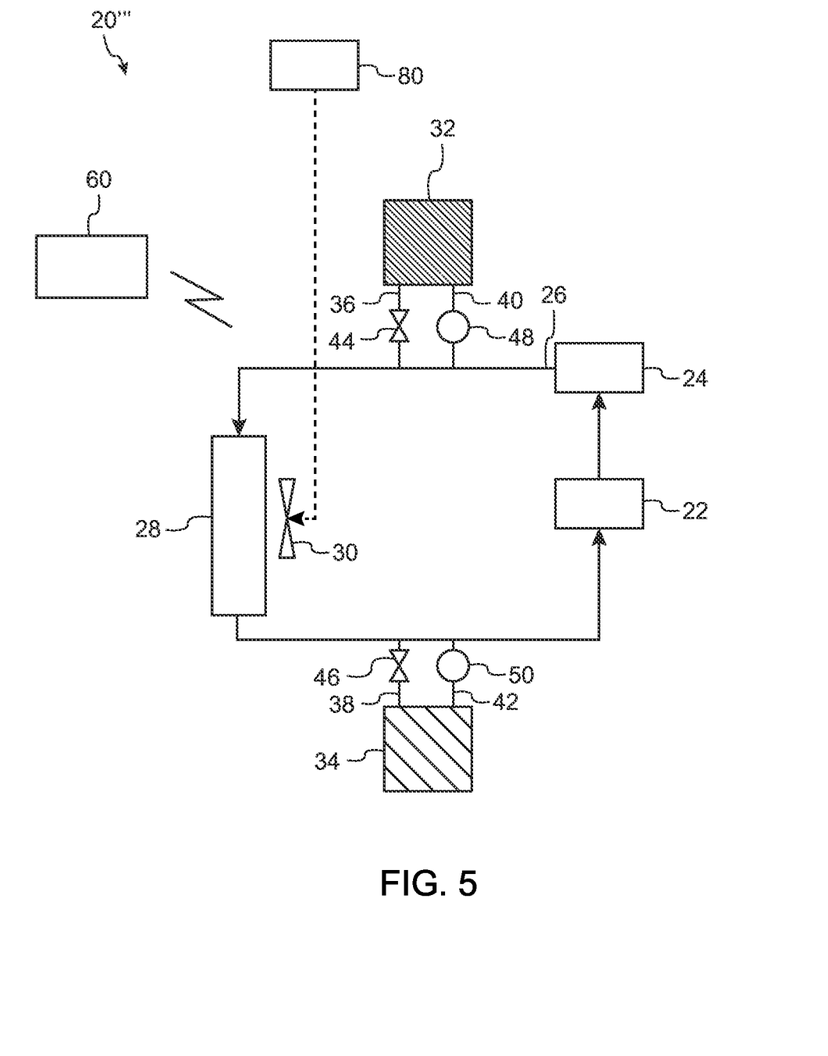
FIG. 5 illustrates a cooling system according to at least a further exemplary embodiment of the invention.

FIG. 5 illustrates a cooling system 20''' according to at least a further exemplary embodiment of the invention. The cooling system 20''' substantially corresponds to the cooling system of FIG. 2. However, FIG. 5 illustrates that the vehicle has an electrical storage system (EES) 80. The control unit 60 is configured to monitor the state of charge of the EES 80. When the control unit 60 determines that the EES 80 has a certain surplus of energy, then the control unit 60 controls at least part of said surplus of energy to be supplied to the positive displacement device 30 to increase the thermal energy removed from the heat exchanger 28. This may in particular be done in a charge mode, i.e. when thermal energy from the first chamber 32 is controlled to be provided to the coolant of the coolant circuit 26 and passed into the heat exchanger 28, after which part of the thermal energy of the cooled coolant leaving the heat exchanger 28 is provided to and stored in the second chamber 34 as stored cold thermal energy. The control unit 60 may thus suitably be configured to increase the fan power of the positive displacement device 30 when the vehicle is operating at a point when said ratio (COPfan) is above said pre-defined value or value range.

As already mentioned, the control unit 60 is in practice included also in the other exemplary embodiments (e.g. FIGS. 3 and 4), although not specifically illustrated. Furthermore, the control unit 60 may for those other exemplary embodiments (e.g. FIGS. 3 and 4) monitor the state of charge of an EES of the vehicle and transfer surplus energy to the positive displacement device 30 in the corresponding manner as shown and explained with reference to the exemplary embodiment of FIG. 5.

The invention claimed is:

1. A cooling system in a fuel cell electric vehicle (FCEV) comprising:
   a coolant circuit circulating a coolant,
   a heat exchanger for cooling the circulating coolant,
   a positive displacement device for removing thermal energy from the heat exchanger to an environment,
   a first chamber configured to contain relatively hot fluid,
   a second chamber configured to contain relatively cold fluid, and
   a control unit configured to monitor a ratio of cooling power/fan power of the positive displacement device and control thermal energy transfer between the coolant and the first and the second chambers based on the ratio,
   wherein when the FCEV is operating at a point where the ratio is above a pre-defined value or value range, thermal energy from the first chamber is provided to the coolant in the coolant circuit and passed into the heat exchanger, after which part of the thermal energy of the cooled coolant leaving the heat exchanger is provided to and stored in the second chamber, and
   wherein when the FCEV is operating at a point where the ratio is below the pre-defined value or value range, stored cold thermal energy from the second chamber is provided to the coolant in the coolant circuit to reduce the temperature of the coolant before it is passed to fuel cells of the FCEV, after which part of the thermal energy of the heated coolant leaving the fuel cells is provided to and stored in the first chamber.

2. The cooling system of claim 1, further comprising:
   fluid connections for providing the first and the second chambers fluid communication with the coolant circuit,
   wherein thermal energy is provided to the first and the second chambers by passing coolant into the first and the second chambers, and
   wherein thermal energy is released from the first and the second chambers by passing coolant away from the first and the second chambers.

3. The cooling system of claim 2, further comprising valves for regulating a flow of coolant to and from the first and the second chambers,
   wherein the control unit is configured to control the valves based on the value of the ratio.

4. The cooling system of claim 2, further comprising:
   a first pump for pumping coolant from the first chamber to the coolant circuit, and
   a second pump for pumping coolant from the second chamber to the coolant circuit,
   wherein the control unit is configured to activate the first pump when the ratio is above the pre-defined value or value range, and
   wherein the control unit is configured to activate the second pump when the ratio is below the predefined value or value range.

5. The cooling system of claim 3:
   wherein the first and the second chambers are variable volume chambers located in a common vessel,
   wherein the first and the second chambers are separated by a movable separation member, such as a diaphragm or a plunger, and
   wherein a pressure difference across the movable separation member is used for driving the coolant out from the respective chamber when the control unit controls the valves based on the ratio.

6. The cooling system of claim 1, further comprising a heat exchanging device in thermal connection to the first chamber and the second chamber, wherein thermal energy is transferred between the coolant circuit and the first and the second chambers via the heat exchanging device.

7. The cooling system of claim 1, wherein the control unit is configured to monitor a state of charge of an electrical storage system (ESS) of the FCEV, and upon determination of a certain surplus of energy in the ESS, the control unit controls at least a part of the surplus of energy to be supplied to the positive displacement device to increase the thermal energy removed from the heat exchanger, wherein thermal energy from the first chamber is provided to the coolant of the coolant circuit and is passed into the heat exchanger, after which part of the thermal energy of the cooled coolant leaving the heat exchanger is provided to and stored in the second chamber.

8. The cooling system of claim 1, wherein the control unit is configured to increase the fan power of the positive displacement device when the FCEV is operating at a point when the ratio is above the pre-define value or value range.

9. A vehicle comprising the cooling system of claim 1.

10. A method of controlling a cooling system in a fuel cell electric vehicle (FCEV), wherein the cooling system comprises a coolant circuit circulating a coolant, a heat exchanger for cooling the circulating coolant, and a positive displacement device for removing thermal energy from the heat exchanger to an environment, the method comprising:
   providing a first chamber configured to contain relatively hot fluid and a second chamber configured to contain relatively cold fluid,
   monitoring a ratio of cooling power/fan power of the positive displacement device, and
   when the FCEV is operating at a point where the ratio is above a pre-defined value or value range, thermal energy from the first chamber is provided to the coolant in the coolant circuit and is passed into the heat exchanger, after which part of the thermal energy of the cooled coolant leaving the heat exchanger is provided to and stored in the second chamber, and when the FCEV is operating at a point where the ratio is below the pre-defined value or value range, then stored cold thermal energy from the second chamber is provided to the coolant in the coolant circuit to reduce the temperature of the coolant before it is passed to the fuel cells of the FCEV, after which part of the thermal energy of the heated coolant leaving the fuel cells is provided to and stored in the first chamber.

11. The method of claim 10, wherein the providing of thermal energy to/from either one of the first and the second chambers comprises transferring coolant between the coolant circuit and the first and the second chambers, respectively.

12. The method of claim 10:
wherein the cooling system further comprises a heat exchanging device in thermal connection with the first and the second chambers, and
wherein the providing of thermal energy to/from either one of the first and the second chambers comprises transferring thermal energy between the coolant of the coolant circuit and the first and the second chambers, respectively via the heat exchanging device.

13. The method of claim 10, further comprising:
monitoring the state of charge of an electrical storage system (ESS) of the FCEV,
upon determination of a certain surplus of energy in the ESS, supplying at least a part of the surplus of energy to the positive displacement device to increase the thermal energy removed from the heat exchanger, and
providing thermal energy from the first chamber to the coolant of the coolant circuit which is passed into the heat exchanger, after which part of the thermal energy of the cooled coolant leaving the heat exchanger is provided to and stored in the second chamber.

14. The method of claim 10, further comprising increasing the fan power of the positive displacement device when the FCEV is operating at a point when the ratio is above the pre-defined value or value range.

15. A computer program comprising program code means for performing the steps of claim 10 when the program is run on a computer.

16. A computer readable medium carrying a computer program comprising program code means for performing the steps of claim 10 when the program product is run on a computer.

17. A control unit for controlling a cooling system of a fuel cell electric vehicle (FCEV), the control unit being configured to perform the steps of the method of claim 10.

* * * * *